US012054968B2

(12) United States Patent
Wu

(10) Patent No.: US 12,054,968 B2
(45) **Date of Patent: *Aug. 6, 2024**

(54) DUAL-CODE LOCK CORE AND DUAL-CODE COMBINATION LOCK

(71) Applicant: SINOX CO., LTD, New Taipei (TW)

(72) Inventor: Chien-Hung Wu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 326 days.

This patent is subject to a terminal disclaimer.

(21) Appl. No.: 17/577,817

(22) Filed: Jan. 18, 2022

(65) Prior Publication Data

US 2022/0243499 A1 Aug. 4, 2022

(30) Foreign Application Priority Data

Feb. 1, 2021 (TW) ................................ 110201235

(51) Int. Cl.
*E05B 37/02* (2006.01)
*E05B 37/00* (2006.01)

(52) U.S. Cl.
CPC .......... *E05B 37/02* (2013.01); *E05B 37/0048* (2013.01); *E05B 37/0058* (2013.01)

(58) Field of Classification Search
CPC .. E05B 37/0065; E05B 37/02; E05B 37/0031; E05B 37/0034; E05B 37/0041; E05B 37/0048; E05B 37/0055; E05B 37/0058
See application file for complete search history.

(56) References Cited

U.S. PATENT DOCUMENTS 5,345,798 A * 9/1994 Nakai ................. E05B 37/0034 70/284
6,711,922 B1 * 3/2004 Tsai ...................... E05B 37/025 70/315
6,799,446 B1 * 10/2004 Tsai ........................ E05B 37/02 70/306
6,880,371 B2 * 4/2005 Huang .................. E05B 37/025 70/312
7,444,844 B1 * 11/2008 Lee ......................... E05B 37/02 70/284
9,267,312 B2 * 2/2016 Zuraski ............... E05B 37/0048
2011/0041574 A1 * 2/2011 Yang ....................... E05B 37/02 70/315
2022/0290463 A1 * 9/2022 Wu ......................... E05C 3/042
2023/0022564 A1 * 1/2023 Li ....................... E05B 37/0048

FOREIGN PATENT DOCUMENTS

CN 102052012 A * 5/2011
WO WO-2010118805 A1 * 10/2010 ......... E05B 37/0034

* cited by examiner

*Primary Examiner* — Kristina R Fulton
*Assistant Examiner* — Noah Horowitz
(74) *Attorney, Agent, or Firm* — Birch, Stewart, Kolasch & Birch, LLP

(57) ABSTRACT

A dual-code lock core is provided, including a first unlocking component, a code wheel, and a second unlocking component. When the code wheel rotates to a first unlocking position, the first unlocking component may move to unlock the dual-code lock core; and when the code wheel rotates to a second unlocking position, the second unlocking component may move to unlock the dual-code lock core.

9 Claims, 18 Drawing Sheets

DUAL-CODE LOCK CORE AND DUAL-CODE COMBINATION LOCK

TECHNICAL FIELD

The present utility model relates to a dual-code lock core and a dual-code combination lock.

BACKGROUND

In public places such as stores, campuses, stations, and gyms, to display or temporarily store items, window cabinets, lockers and the like are equipped with locks to prevent deliberate theft or unintentional access.

Common locks used for the above public places include key locks and combination locks. The key locks are inconvenient to manage and easy to lose. In contrast, codes of the combination locks can be set by users without keys. Therefore, the combination locks do not have trouble as the above key locks.

During using the combination locks, the users set the codes according to their preferences. However, conventional combination locks can only be provided with one group of codes or two groups of related codes. For example, a first group of codes and a second group of codes are spaced by a fixed number. Therefore, it is difficult to meet the requirement of multiple people sharing or individual use. On the other hand, the conventional combination locks only use one unlocking component, which is not conducive to structural design changes. Base on the above, there is still a space for improving the conventional combination locks.

SUMMARY

An objective of the present utility model is to provide a dual-code lock core used for a combination lock, which has better convenience of use and resolves the above problems in the related art.

Another objective of the present utility model is to provide a dual-code combination lock including the dual-code lock core, which has better convenience of use and resolves the above problems in the related art.

The dual-code lock core includes a first unlocking component, a code wheel, and a second unlocking component. When the code wheel rotates to a first unlocking position, the first unlocking component may move to unlock the dual-code lock core; and when the code wheel rotates to a second unlocking position, the second unlocking component may move to unlock the dual-code lock core.

In embodiments of the present utility model, the first unlocking component extends in a first axial direction. The code wheel is sleeved on the first unlocking component. The second unlocking component is arranged at an outer side of the code wheel, and is provided with an engaging member toward the code wheel. When the code wheel rotates to a position other than the first unlocking position, movement of the first unlocking component is restricted. When the code wheel rotates to a position other than the second unlocking position, the engaging member is away from the code wheel.

In the embodiments of the present utility model, the dual-code lock core further includes a first code component and a second code component. The first code component is sleeved on the first unlocking component, and the code wheel is sleeved outside the first code component. The second code component is arranged in the code wheel in a manner of surrounding the first code component, and when the code wheel rotates to the second unlocking position, the second unlocking component is movable so as to be separated from or engaged with the second code component.

In the embodiments of the present utility model, the first unlocking position and the second unlocking position are independently defined.

In the embodiments of the present utility model, the second code component and the code wheel are integrally formed.

In the embodiments of the present utility model, the first code component is provided with a first code component outer edge convex piece. The code wheel is provided with a first inner edge and a second inner edge. The second code component is arranged in the second inner edge of the code wheel in the manner of surrounding the first code component, and is provided with an engaging portion. When the code wheel is located in the first unlocking position, the first code component is movable in the first axial direction for making the first code component outer edge convex piece separated from or engaged with the first inner edge. When the code wheel is located in the second unlocking position, the second unlocking component is movable in the first axial direction for making the engaging member separated from or engaged with the engaging portion.

The dual-code combination lock of the present utility model includes a housing, a dual-code lock core, a limiting member, a first control member, and a second control member. The dual-code lock core is arranged in the housing. The limiting member is arranged at one side of the housing, and is rotatable relative to a second axial direction. The first control member is connected to the limiting member, to control movement of the first unlocking component and rotation of the limiting member. The second control member is connected to the limiting member, to control movement of the second unlocking component and the rotation of the limiting member.

In the embodiments of the present utility model, the limiting member includes a baffle plate, a limiting member rotation shaft, and a limiting member driving piece. The limiting member rotation shaft is rotatable relative to the second axial direction, and is connected to one end of the baffle plate to drive the baffle plate to rotate relative to the second axial direction. The limiting member driving piece is separately connected to the limiting member rotation shaft, the first control member, and the second control member, and may rotate relative to the second axial direction and move in the second axial direction.

In the embodiments of the present utility model, the first control member includes a first rotation member and a driving cylinder. The first rotation member is rotatable relative to the second axial direction and is arranged at the other side of the housing relative to the limiting member. The driving cylinder may rotate relative to the second axial direction, two opposite ends of the driving cylinder are separately connected to the first rotation member and the limiting member driving piece, and the driving cylinder is provided with a peripheral surface separately abutting against an end portion of the first unlocking component and a first code component driving piece. The second control member may rotate relative to the second axial direction and move in the second axial direction, is arranged at the other side of the housing relative to the limiting member, and is provided with a second rotation member and a second control member rotation shaft that are connected to each other, and the second control member rotation shaft penetrates the housing and the first rotation member and is connected to the limiting member driving piece.

In the embodiments of the present utility model, a fixing portion is provided on a bottom portion of the driving cylinder, a fixing member corresponding to the fixing portion is provided on a top portion of the limiting member driving piece, and the second control member may move toward the limiting member rotation shaft to make the fixing portion separated from the fixing member.

In the embodiments of the present utility model, the second unlocking component includes a limiting end portion, the limiting member driving piece includes a limiting flange, and when the second unlocking component moves in the first axial direction to make an engaging member separated from an engaging portion, the limiting end portion is located between the limiting flange and the limiting member rotation shaft, to stop the second control member from moving toward the limiting member rotation shaft to make the fixing portion separated from the fixing member.

DETAILED DESCRIPTION

Figure 1A:
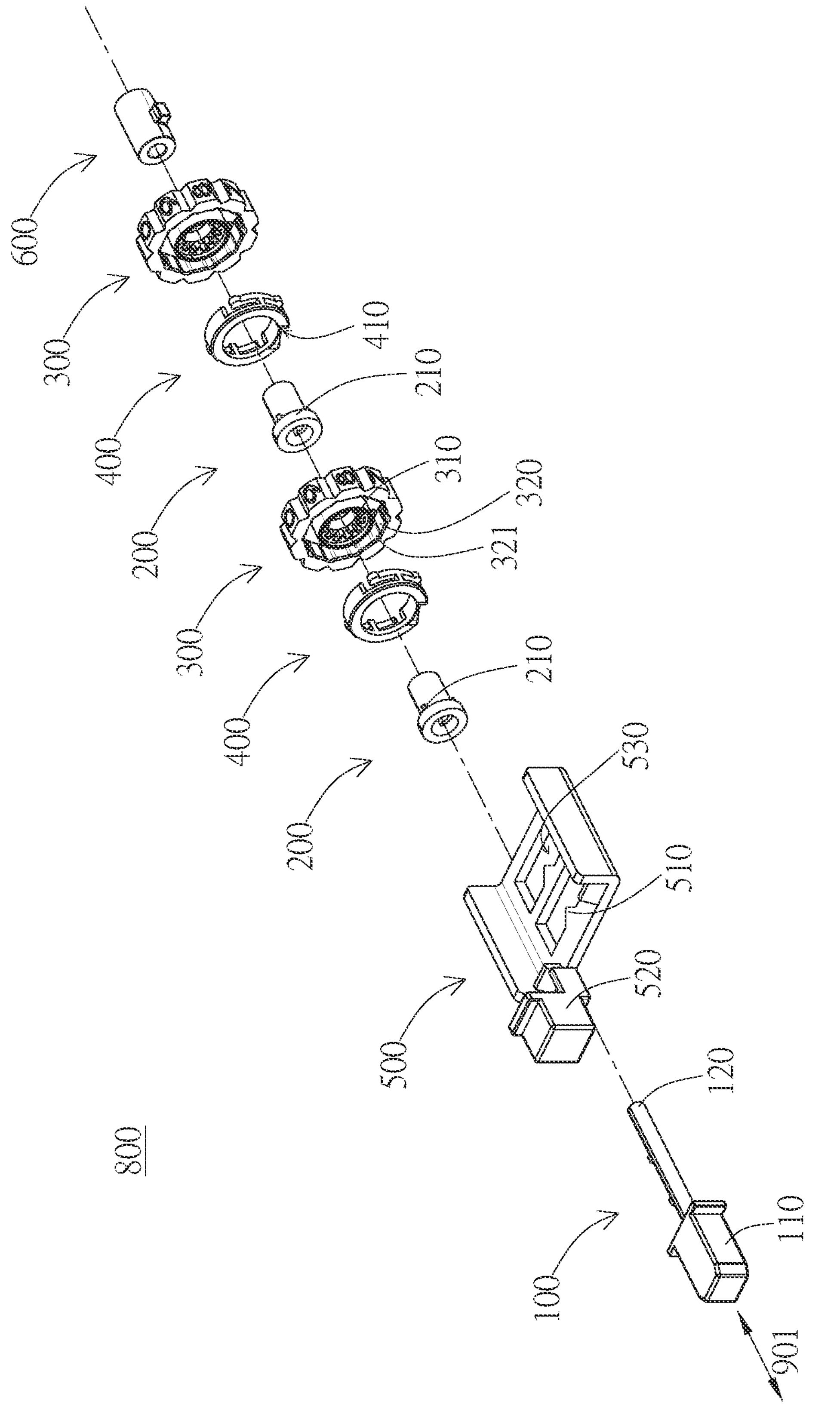
FIG. 1A and FIG. 1B are schematic exploded views of an embodiment of a dual-code lock core of the present utility model.
Figure 1B:
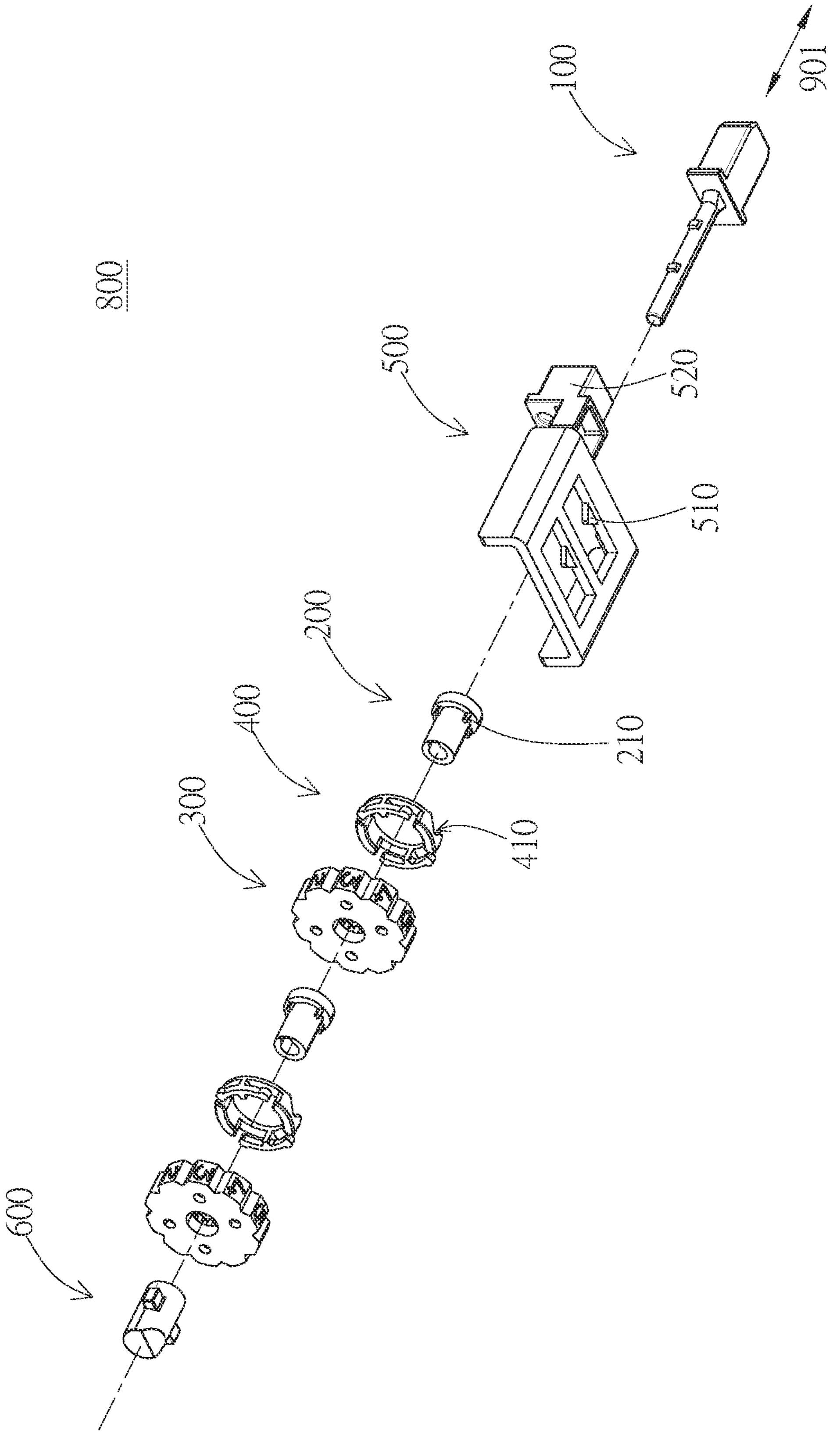
Figure 2A:
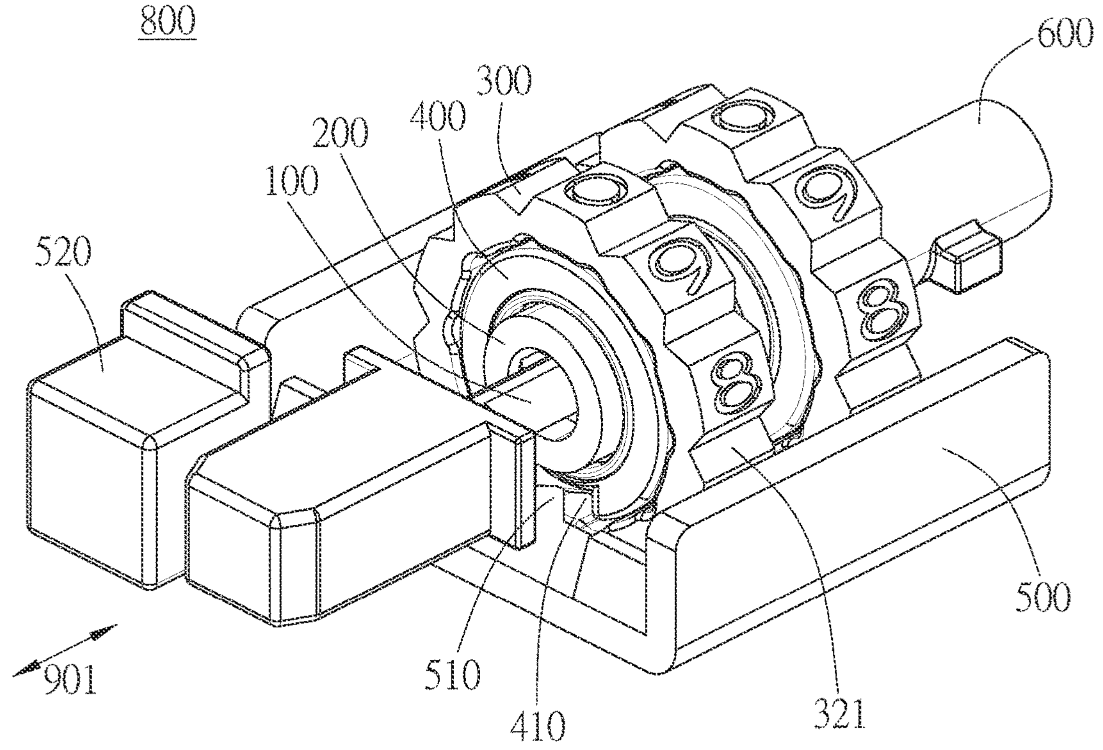
FIG. 2A and FIG. 2B are schematic diagrams of the embodiment of the dual-code lock core of the present utility model.
Figure 2B:
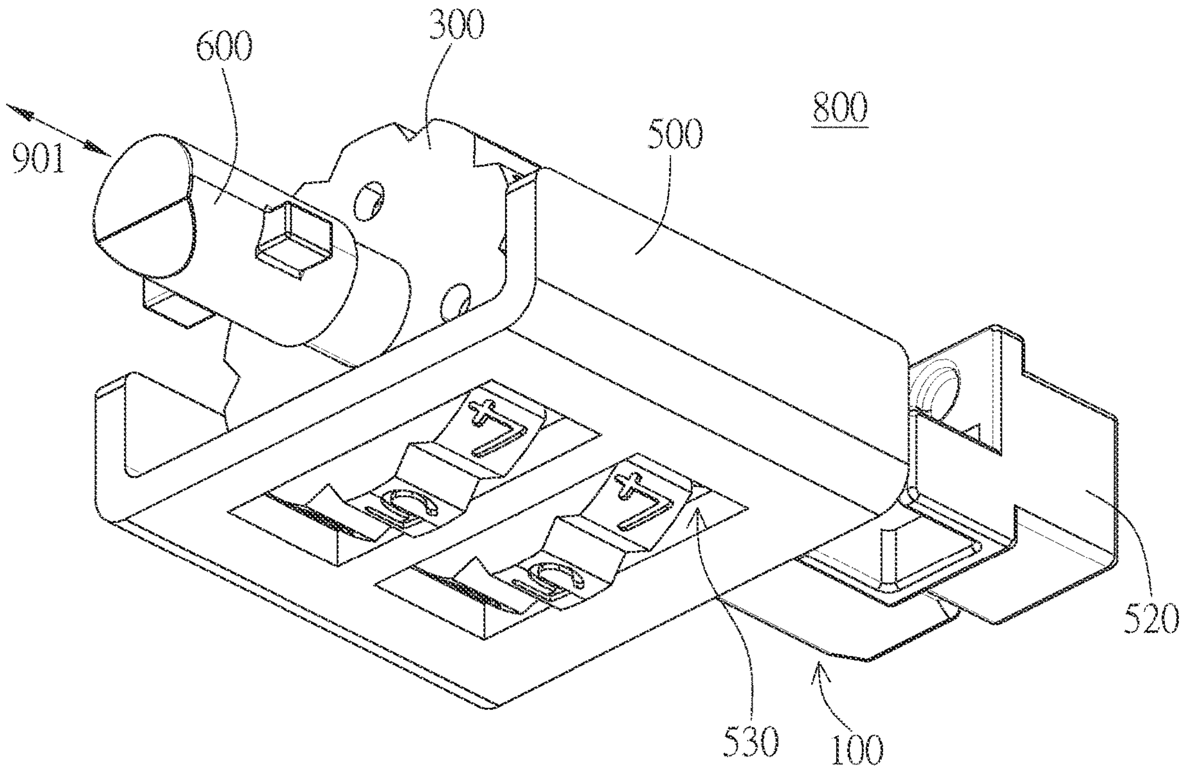

In an embodiment, a dual-code lock core of the present utility model may be used as a lock core of a cabinet lock. However, in different embodiments, the dual-code lock core of the present utility model may be used as a lock core of different locks, for example, but not limited to, a bicycle lock, a box lock, a door lock, an electronic device lock and the like according to requirements.

In an embodiment shown in FIG. 1A to FIG. 2B, a dual-code lock core 800 of the present utility model includes a first unlocking component 100, a code wheel 300, and a second unlocking component 500. When the code wheel 300 rotates to a first unlocking position, the first unlocking component 100 may move to unlock the dual-code lock core 800; and when the code wheel 300 rotates to a second unlocking position, the second unlocking component 500 may move to unlock the dual-code lock core 800. The first unlocking component 100 extends in a first axial direction 901, and is a shaft rod, but is not limited thereto. An end portion 110 of the first unlocking component 100 may be configured to receive an external force, or abut against or be connected to the outside. The code wheel 300 is sleeved on the first unlocking component 100. The second unlocking component 500 is arranged at an outer side of the code wheel 300, and is provided with an engaging member 510 toward the code wheel 300. When the code wheel 300 rotates to a position other than the first unlocking position, movement of the first unlocking component 100 is restricted. When the code wheel 300 rotates to a position other than the second unlocking position, the engaging member 510 is away from the code wheel 300.

In the embodiment shown in FIG. 1A to FIG. 2B, the dual-code lock core 800 further includes a first code component 200 and a second code component 400. The first code component 200 is sleeved on the first unlocking component 100. The code wheel 300 is sleeved outside the first code component 200. The second code component 400 is arranged in the code wheel 300 in a manner of surrounding the first code component 200. In this embodiment, the second code component 400 and the code wheel 300 are components that are independent and assembled in an engaged manner. However, in different embodiments, the second code component 400 and the code wheel 300 may be integrally formed. On the other hand, in this embodiment, quantities of code wheels 300, and first code components 200 and second code components 400 corresponding to the code wheels 300 are four groups. However, in different embodiments, the quantities may be adjusted according to considerations such as use, design, and manufacture. For example, to increase the difficulty of unlocking, the quantities are increased; or to reduce the volume, reduce the manufacturing costs, and the like, the quantities are reduced.

Further, the first code component 200 is preferably, but not limited to, a sleeve, and is provided with a first code component outer edge convex piece 210; the code wheel 300 is provided with a first inner edge 310 and a second inner edge 320; and when the first code component 200 is engaged with the code wheel 300, the first code component outer edge convex piece 210 is sleeved in the first inner edge 310. The second code component 400 is arranged in the second inner edge 320 of the code wheel 300 in the manner of surrounding the first code component 200, and is provided with an engaging portion 410.

In an embodiment shown in FIG. 3A to FIG. 4B, when the code wheel 300 rotates to the first unlocking position, for example, a first unlocking code combination, relative to the first unlocking component 100, the first unlocking component 100 may move in the first axial direction 901 relative to the code wheel 300, to unlock the dual-code lock core 800. When the code wheel 300 rotates to the second unlocking position, for example, a second unlocking code combination, relative to the first unlocking component 100, the second unlocking component 500 is movable so as to be separated from the second code component 400, to unlock the dual-code lock core 800, or to be engaged with the second code component 400, to lock the dual-code lock core 800. The dual-code lock core 800 further includes one end 120 of a first code component driving piece 600 arranged on the first unlocking component 100, and the first code component driving piece 600 may drive the first code component 200 to move in the first axial direction 901.

Figure 3A:
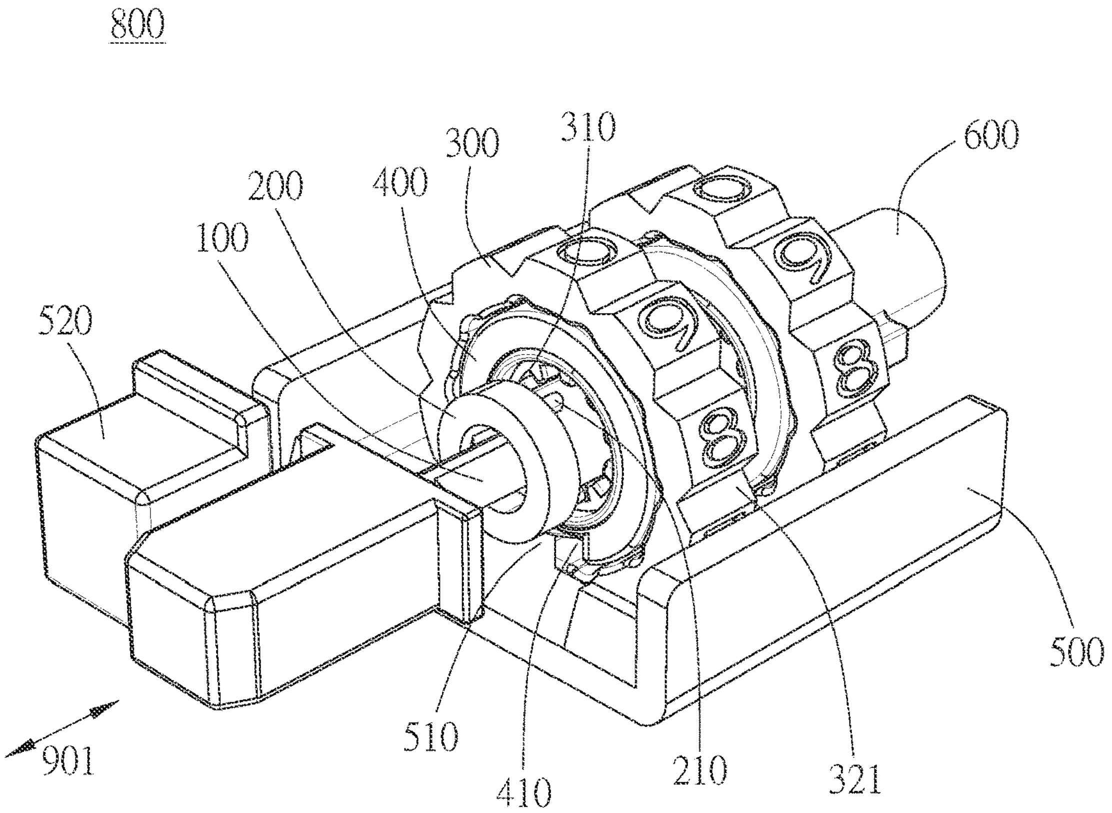
FIG. 3A and FIG. 3B are schematic diagrams of an embodiment of a first code component being separated from a code wheel in the dual-code lock core of the present utility model.
Figure 3B:
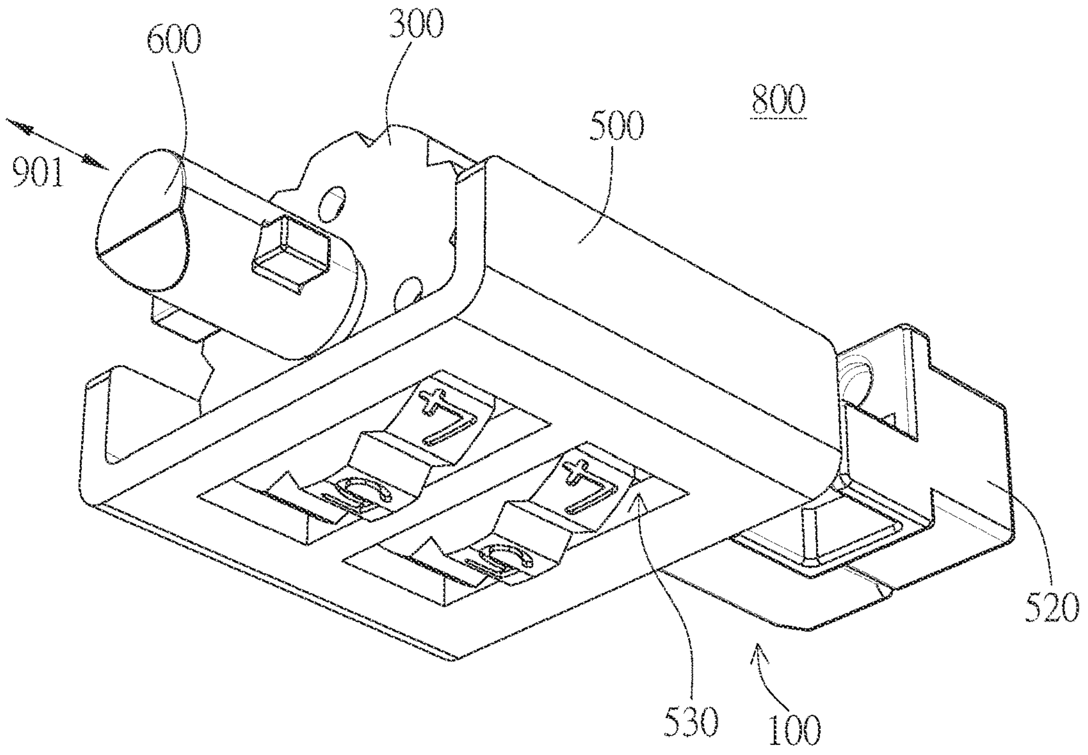

In the embodiment shown in FIG. 3A and FIG. 3B, when the first code component 200 is separated from the code wheel 300, the code wheel 300 may rotate independently relative to the first code component 200 for a code change. More specifically, when the code wheel 300 is located in the first unlocking position, the first code component 200 is movable in the first axial direction 901 for making the first code component outer edge convex piece 210 separated from or engaged with the first inner edge 310. In this embodiment, an engaging unit corresponding to the first code component outer edge convex piece 210 is arranged on a surface of the first inner edge 310, and when the first code component outer edge convex piece 210 is separated from the first inner edge 310, the code wheel 300 may rotate independently relative to the first code component 200 for the code change. A structure of a part of the first code component 200 corresponding to the code wheel 300 and a manner of the code change are conventionally known, and are not described herein.

Figure 4A:
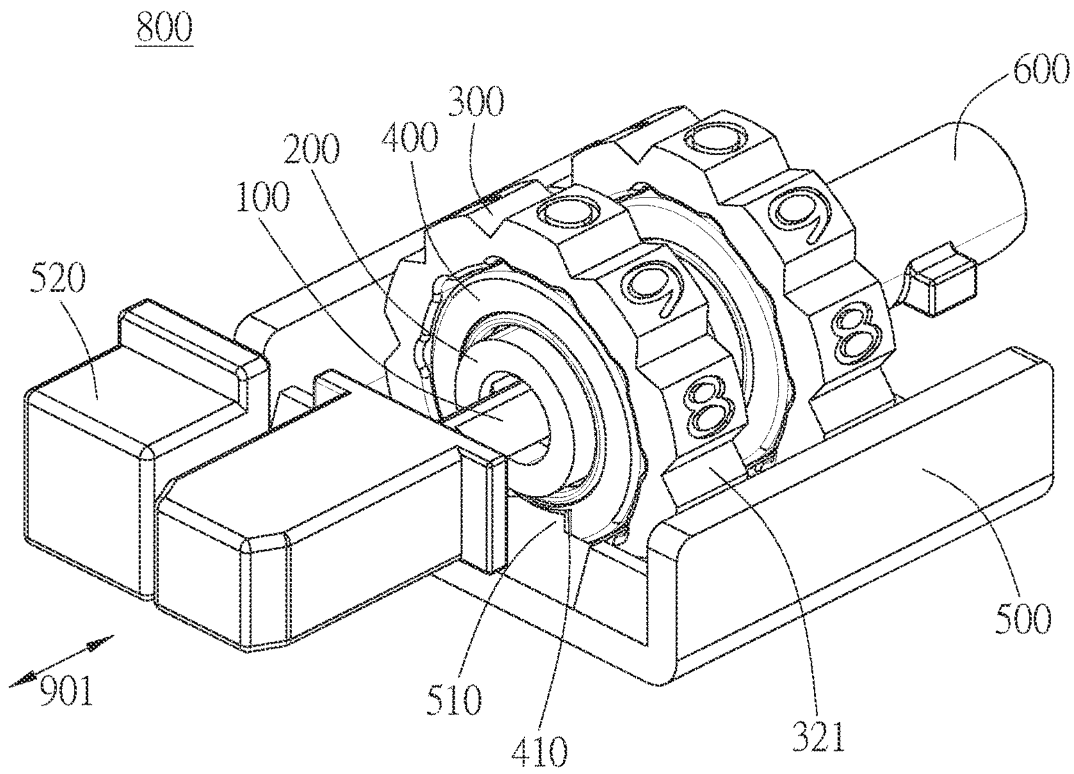
FIG. 4A and FIG. 4B are schematic diagrams of an embodiment of a second unlocking component being engaged with a second code component in the dual-code lock core of the present utility model.
Figure 4B:
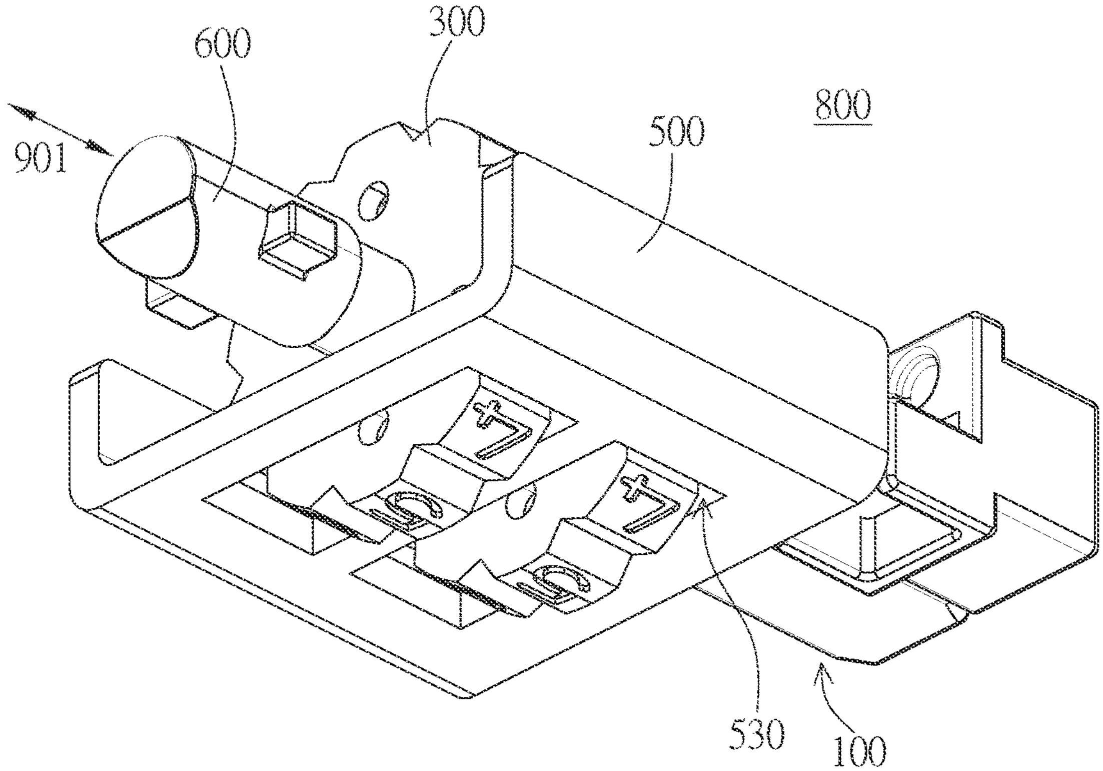

In an embodiment shown in FIG. 4A and FIG. 4B, when the code wheel 300 is located in the second unlocking position, the second unlocking component 500 is movable in the first axial direction 901 for making the engaging member 510 away from or close to the code wheel 300, thereby making the engaging member 510 separated from or engaged with the engaging portion 410. The first unlocking position and the second unlocking position may be the same or different, i.e., a user may set to make the first unlocking code combination and the second unlocking code combination the same or different. Further, the first unlocking position and the second unlocking position are independently defined, i.e., there is no fixed relationship between the first unlocking code combination and the second unlocking code combination.

In the embodiment shown in FIG. 4A and FIG. 4B, the second unlocking component 500 may be provided with a stress portion 520 for receiving an external force, or may be provided with a hollow portion 530 for at least a part of the code wheel 300 and the second code component 400 to penetrate, to reduce an occupied entire space.

Figure 5A:
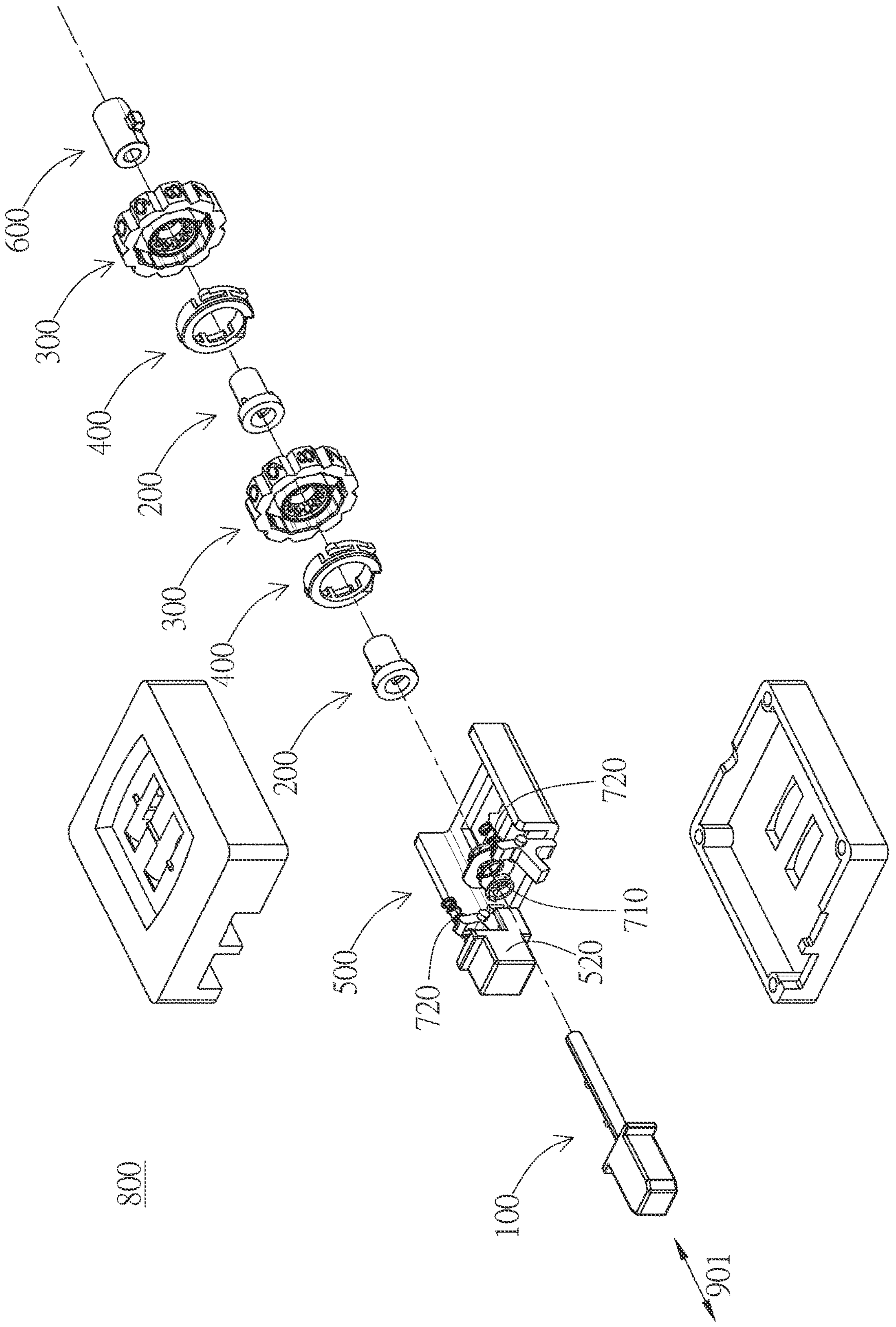
FIG. 5A and FIG. 5B are schematic exploded views of an embodiment of a first elastic member and a second elastic member included in the dual-code lock core of the present utility model.
Figure 5B:
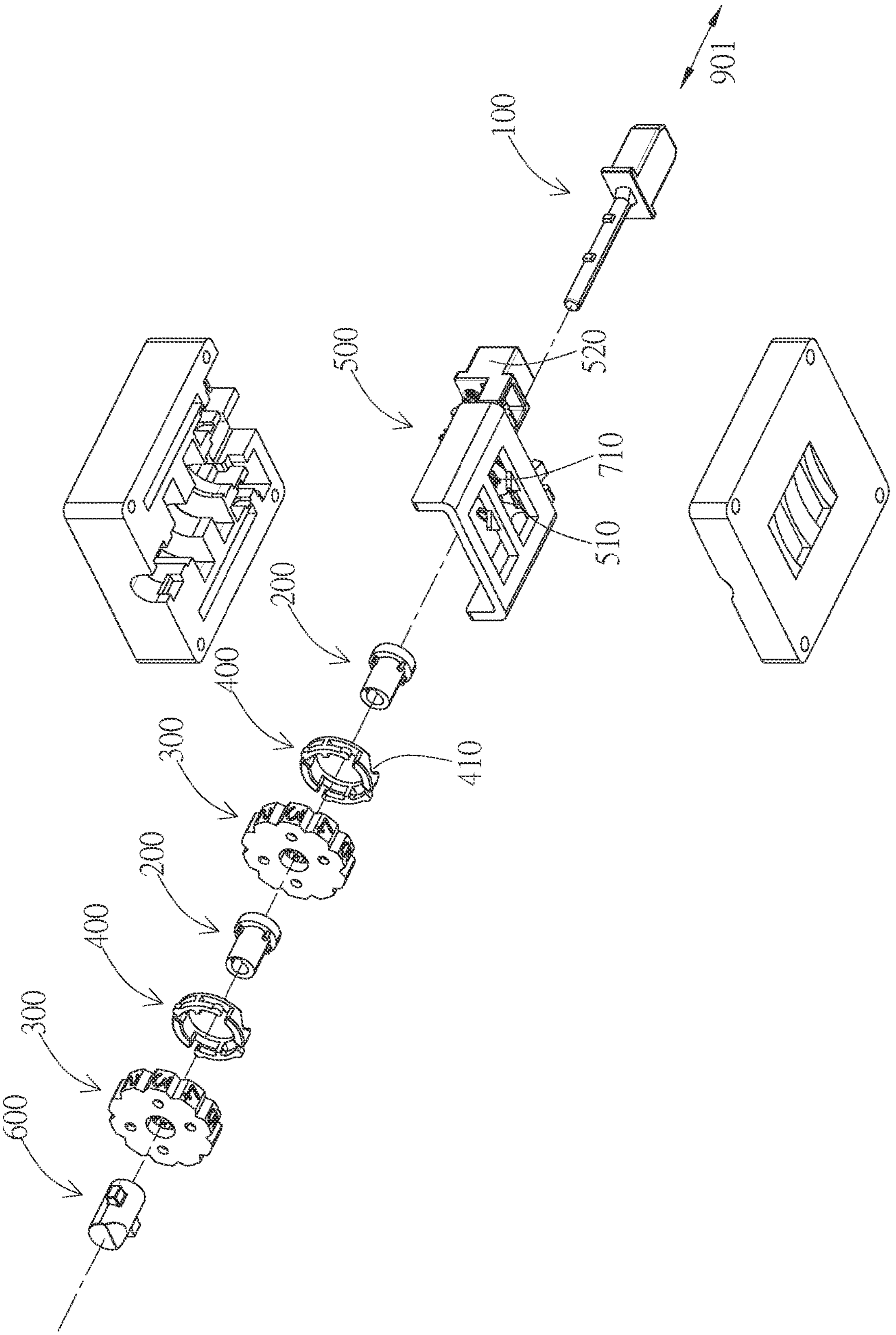
Figure 5C:
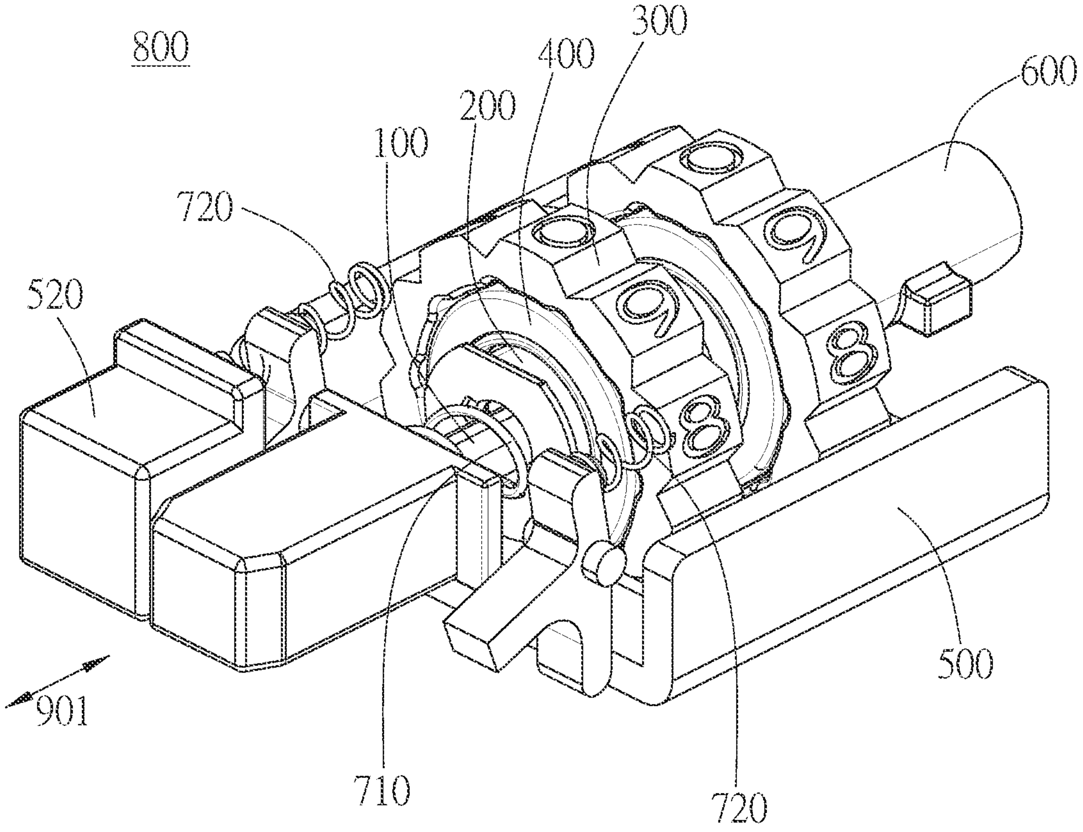
FIG. 5C is a schematic diagram of the embodiment of the first elastic member and the second elastic member included in the dual-code lock core of the present utility model.
Figure 6A:
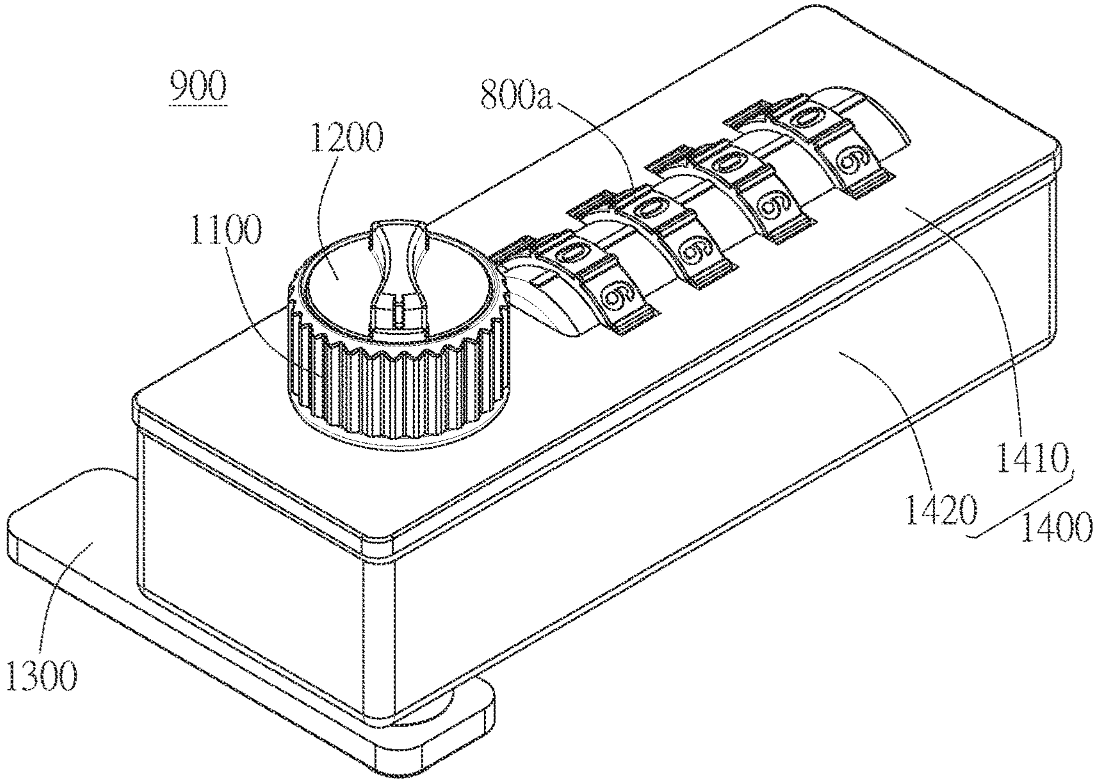
FIG. 6A and FIG. 6B are schematic diagrams of an embodiment of a dual-code combination lock of the present utility model.
Figure 6B:
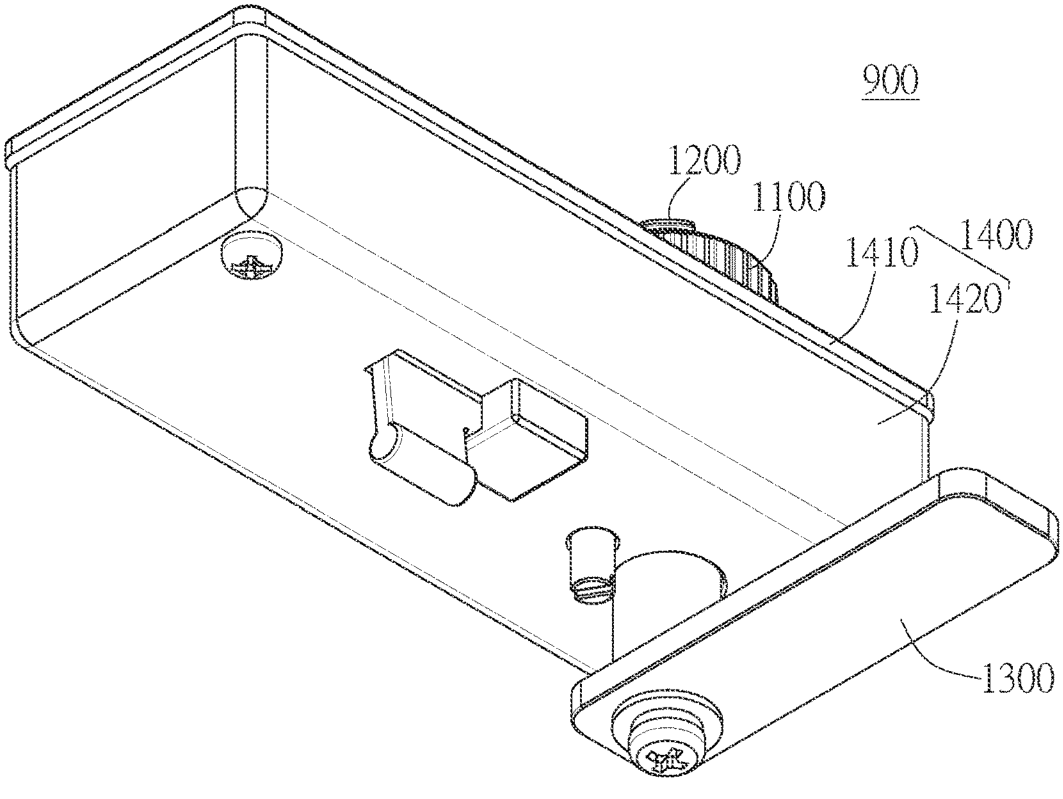
Figure 6C:
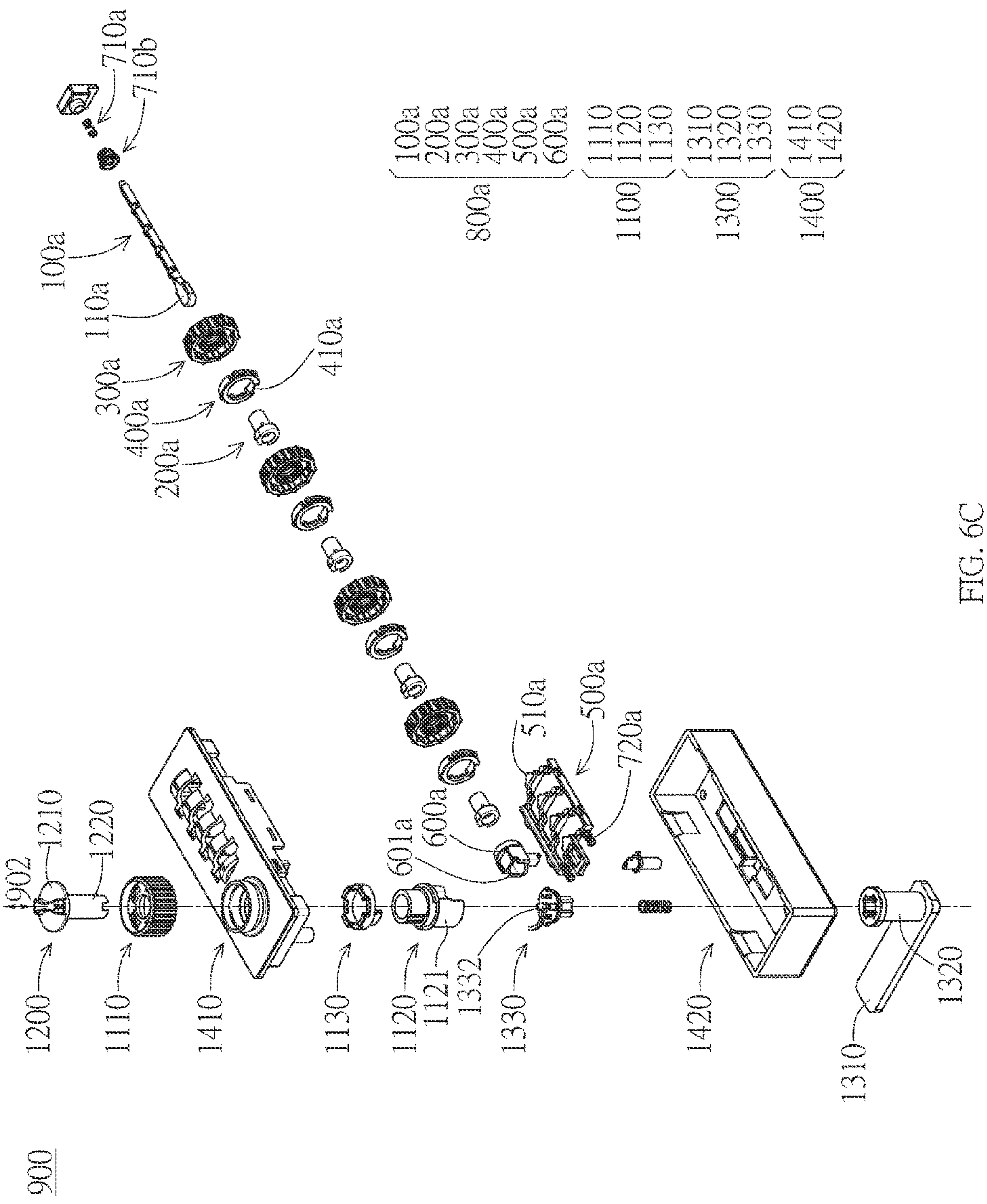
FIG. 6C and FIG. 6D are schematic exploded views of the embodiment of the dual-code combination lock of the present utility model.
Figure 6D:
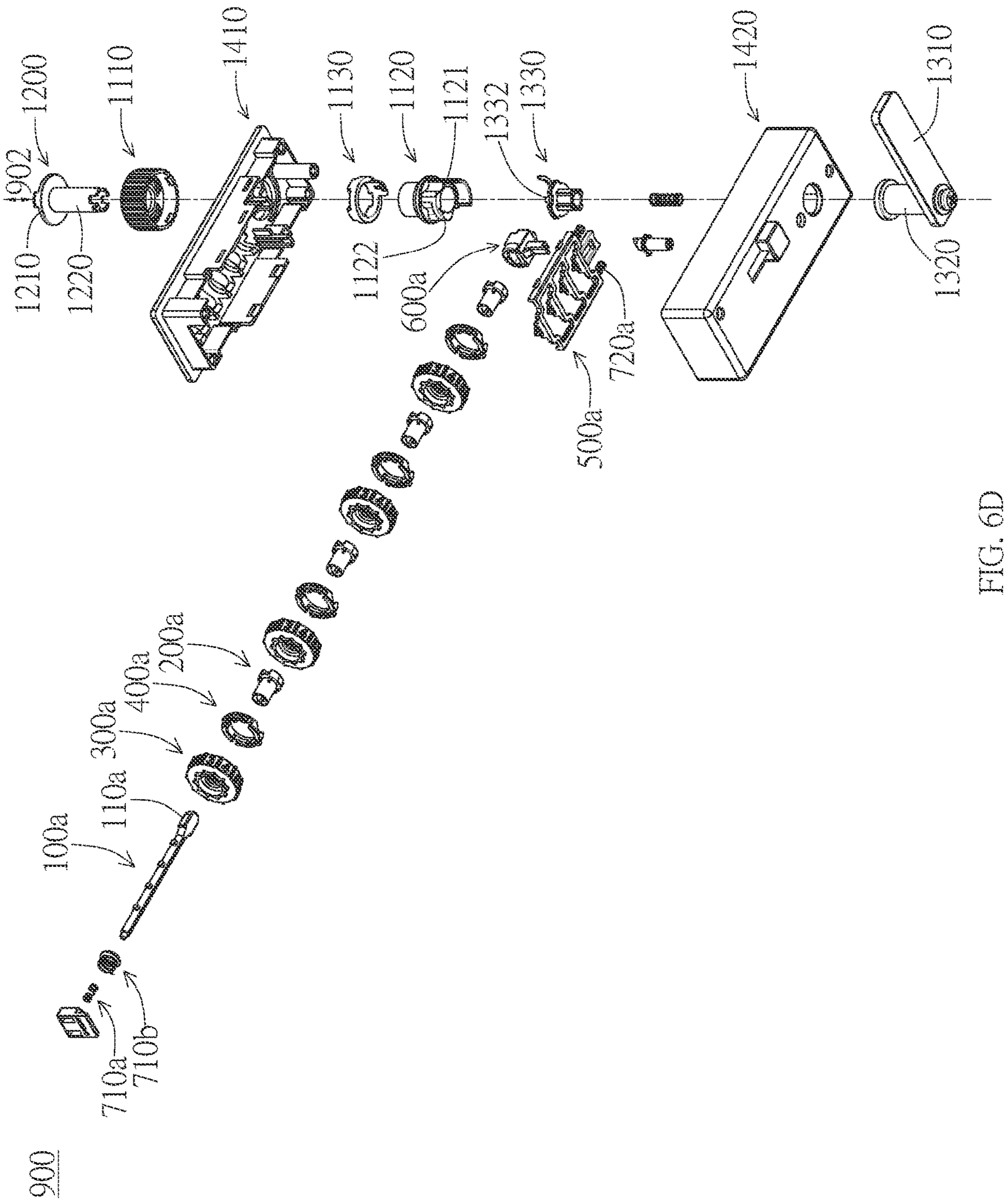

In an embodiment shown in FIG. 5A to FIG. 5C, the dual-code lock core 800 further includes a first elastic member 710 sleeved on the first unlocking component 100 and located between the first unlocking component 100 and the first code component 200, to provide an elastic force acting on the first unlocking component 100 and the first code component 200 in the first axial direction 901. The dual-code lock core 800 further includes a second elastic member 720 arranged between the second unlocking component 500 and an inner wall of a housing, to provide an elastic force acting on the second unlocking component 500 in the first axial direction 901. Further, when the first unlocking component 100 moves, under an external force, in the first axial direction 901 to make the end portion 110 close to the code wheel 300, the first elastic member 710 is compressed to generate an elastic force, and when the external force disappears, the elastic force pushes the first unlocking component 100 to move to make the end portion 110 away from the code wheel 300. When the first code component driving piece 600 is driven by an external force to make the first code component 200 move in the first axial direction 901 to be close to the end portion 110, the first elastic member 710 is compressed to generate an elastic force, and when the external force disappears, the elastic force pushes the first code component 200 and the first code component driving piece 600 to move in the first axial direction 901 to be away from the end portion 110. When the second unlocking component 500 moves, under an external force, in the first axial direction 901 to make the engaging member 510 close to the engaging portion 410, the second elastic member 720 is compressed to generate an elastic force, and when the external force disappears, the elastic force pushes the second unlocking component 500 to move to make the engaging member 510 away from the engaging portion 410.

In an embodiment, the dual-code lock core of the present utility model may be assembled with other components to form a dual-code combination lock. Further, the dual-code combination lock may be a cabinet lock. However, in different embodiments, the dual-code combination lock may be, but is not limited to, a bicycle lock, a box lock, a door lock, an electronic device lock, or the like.

In an embodiment shown in FIG. 6A to FIG. 6D, a dual-code combination lock 900 includes a dual-code lock core 800*a*, a first control member 1100, a second control member 1200, a limiting member 1300, and a housing 1400. In this embodiment, the housing 1400 includes an upper housing 1410 and a lower housing 1420. However, in different embodiments, the shape, combination or mode of the housing may be adjusted according to the requirement of use, manufacture or design. For example, when the dual-code combination lock is applied to a trunk body, a concave portion may be formed on a trunk shell to arrange components such as the dual-code lock core 800*a*, the first control member 1100, the second control member 1200, and the limiting member 1300. In this case, side walls of the concave portion of the trunk shell may be regarded as the housing.

The dual-code lock core 800*a* is arranged in the housing 1400. The limiting member 1300 is arranged at one side of the housing 1400, and is rotatable relative to a second axial direction 902. The first control member 1100 is connected to the limiting member 1300, to control movement of the first unlocking component 100*a* and rotation of the limiting member 1300. The second control member 1200 is connected to the limiting member 1300, to control movement of the second unlocking component 500*a* and the rotation of the limiting member 1300.

More specifically, in this embodiment, the limiting member 1300 includes a baffle plate 1310, a limiting member rotation shaft 1320, and a limiting member driving piece 1330. The limiting member rotation shaft 1320 is rotatable relative to the second axial direction 902, and is connected to one end of the baffle plate 1310 to drive the baffle plate 1310 to rotate relative to the second axial direction 902. The limiting member driving piece 1330 is separately connected to the limiting member rotation shaft 1320, the first control member 1100, and the second control member 1200, and may rotate relative to the second axial direction 902 and move in the second axial direction 902.

In the embodiment shown in FIG. 6A to FIG. 6D, the first control member 1100 includes a first rotation member 1110 and a driving cylinder 1120. The first rotation member 1110 is rotatable relative to the second axial direction 902 and is arranged at the other side of the housing 1400 relative to the limiting member 1300. The driving cylinder 1120 may rotate relative to the second axial direction 902, and two opposite ends of the driving cylinder 1120 are separately connected to the first rotation member 1110 and the limiting member driving piece 1330. The first control member 1100 may further include a first control member connecting piece 1130, and the driving cylinder 1120 is connected to the first rotation member 1110 through the first control member connecting piece 1130.

In the embodiment shown in FIG. 6A to FIG. 6D, the second control member 1200 may rotate relative to the second axial direction 902 and move in the second axial direction 902, is arranged at the other side of the housing 1400 relative to the limiting member 1300, and is provided with a second rotation member 1210 and a second control member rotation shaft 1220 that are connected to each other, and the second control member rotation shaft 1220 penetrates the housing 1400 and the first rotation member 1110 and is connected to the limiting member driving piece 1330. A fixing portion 1122 is provided on a bottom portion of the driving cylinder 1120, a fixing member 1332 corresponding to the fixing portion 1122 is provided on a top portion of the limiting member driving piece 1330, and the second control member 1200 may move toward the limiting member rotation shaft 1320, to drive the limiting member driving piece 1330 to move toward the limiting member rotation shaft 1320, thereby making the fixing portion 1122 separated from the fixing member 1332.

Figure 7A:
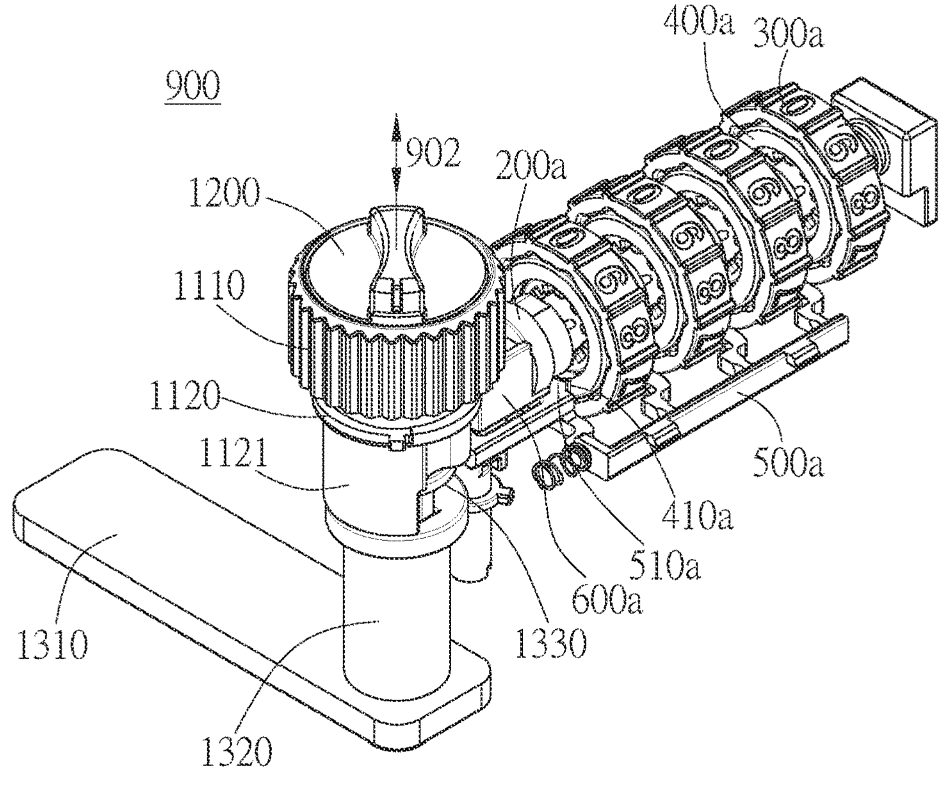
FIG. 7A and FIG. 7B are schematic diagrams of an embodiment of assembly of some components in the dual-code combination lock of the present utility model.
Figure 7B:
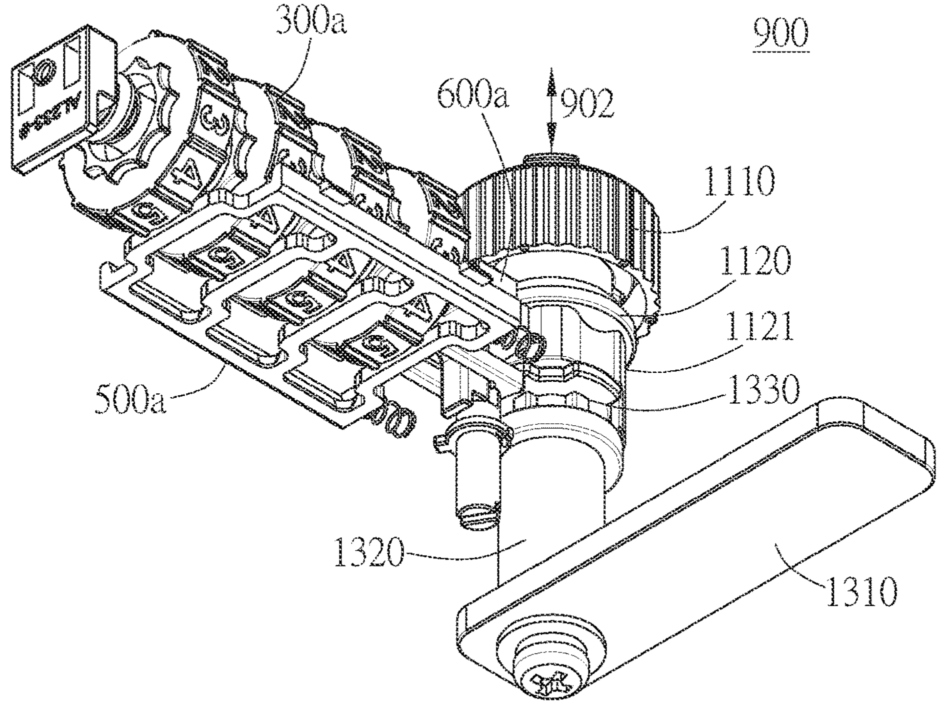

In an embodiment, a structure of the dual-code combination lock 900 of the present utility model after assembly is shown in FIG. 7A and FIG. 7B. For clarity and ease of understanding, some components such as the housing, are not shown in FIG. 7A and FIG. 7B and figures below. An actuation manner of the dual-code combination lock 900 of this embodiment is further described below.

Figure 8A:
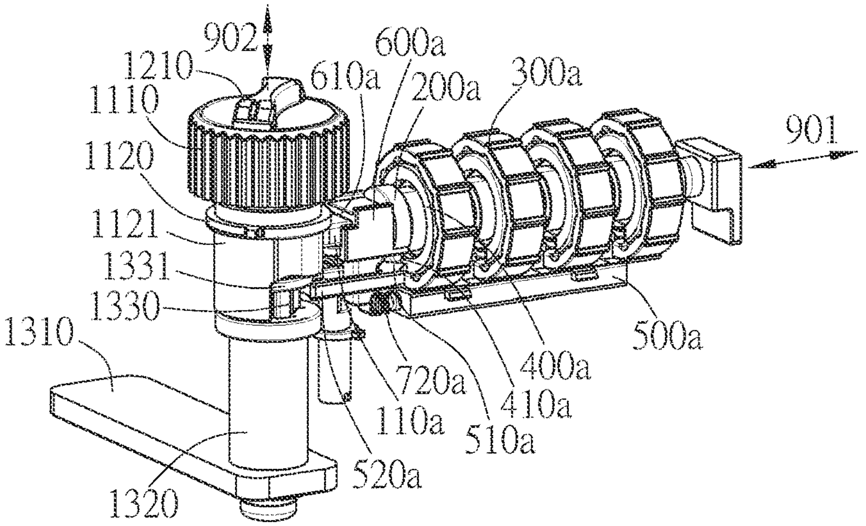
FIG. 8A to FIG. 8C are schematic diagrams of an embodiment of an end portion being fixed in a first peripheral surface concave portion in the dual-code combination lock of the present utility model.
Figure 8B:
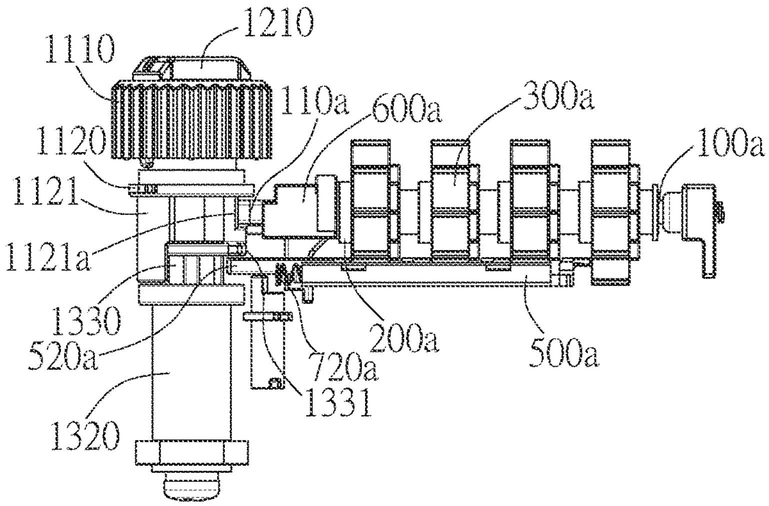
Figure 8C:
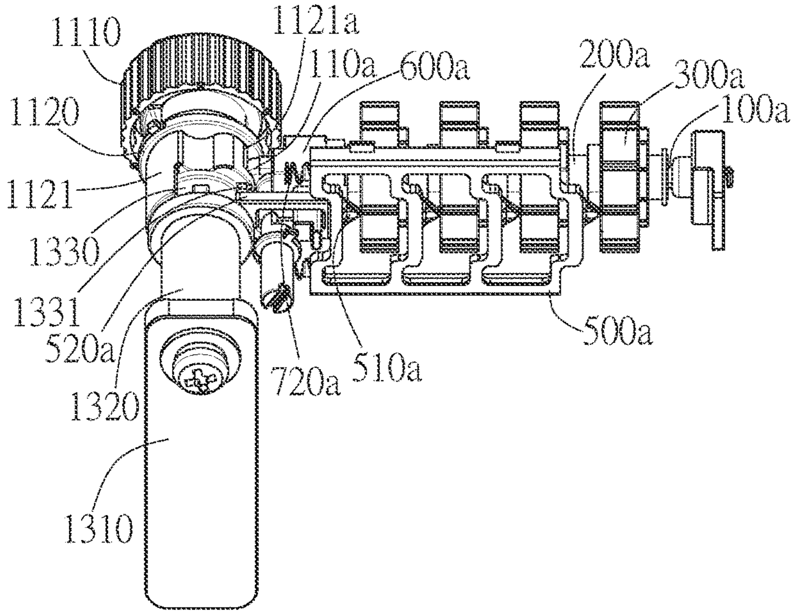

In an embodiment shown in FIG. 8A to FIG. 8C, the baffle plate 1310 is located in a locked position of the limiting member, and an end portion 110*a* of the first unlocking component 100*a* and a first code component driving piece 600*a* separately abut against a peripheral surface 1121 of the driving cylinder 1120. The end portion 110*a* may enter a first peripheral surface concave portion 1121*a*. In this embodiment, the first code component driving piece 600*a* is preferably provided with a hole 610*a* for the end portion 110*a* to penetrate, but is not limited thereto. An elastic member 710*a* (referring to FIG. 6C and FIG. 6D) provides an elastic force in a first axial direction 901 to make the first unlocking component 100*a* move toward the driving cylinder 1120. In this case, if a code wheel 300*a* is not located in a first unlocking position, the first unlocking component 100*a* cannot move in the first axial direction 901. Therefore, the end portion 110*a* is fixedly located in the first peripheral surface concave portion 1121*a*, to restrict rotation of the driving cylinder 1120, thereby making the baffle plate 1310 fixed in the locked position of the limiting member, and the baffle plate 1310 cannot be rotated by rotating the first rotation member 1110. In this way, a locked state can be maintained.

On the other hand, in the embodiment shown in FIG. 8A, if the code wheel 300*a* is not located in a second unlocking position, an engaging portion 410*a* of at least one second code component 400*a* does not correspond to an engaging member 510*a*. Therefore, the engaging member 510*a* cannot enter the engaging portion 410*a* to be separated from the engaging portion 410*a*, i.e., the engaging member 510*a* may be pushed by a component other than the engaging portion 410*a* of the second code component 400*a* to be essentially away from the code wheel 300*a*. In this case, in the embodiment shown in FIG. 8B, the second unlocking component 500*a* moves in the first axial direction 901, to make a limiting end portion 520*a* of the second unlocking component 500*a* located between a limiting flange 1331 of the limiting member driving piece 1330 and the limiting member rotation shaft 1320, to stop the second control member 1200 from moving toward the limiting member rotation shaft 1320 to make the fixing portion 1122 separated from the fixing member 1332 (referring to FIG. 6C and FIG. 6D). In other words, the fixing portion 1122 is still engaged with the fixing member 1332 in this case, so that the limiting member driving piece 1330 and the driving cylinder 1120 are fixed in an engaged manner to synchronize in this case. The code wheel 300*a* is not located in the first unlocking position, the rotation of the driving cylinder 1120 is restricted, and therefore rotation of the limiting member driving piece 1330 is restricted. Therefore, the baffle plate 1310 cannot be rotated by rotating the second rotation member 1210.

Figure 9A:
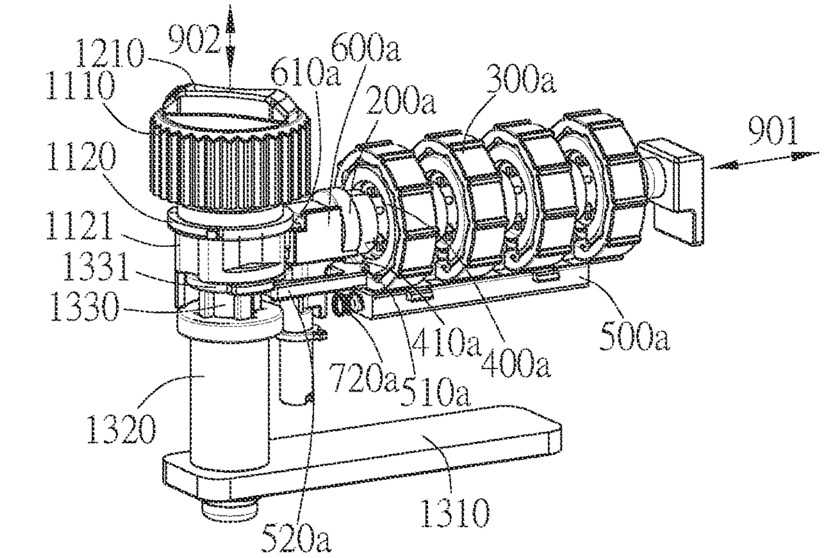
FIG. 9A to FIG. 9C are schematic diagrams of an embodiment of a first code component driving piece entering a second peripheral surface concave portion in the dual-code combination lock of the present utility model.
Figure 9B:
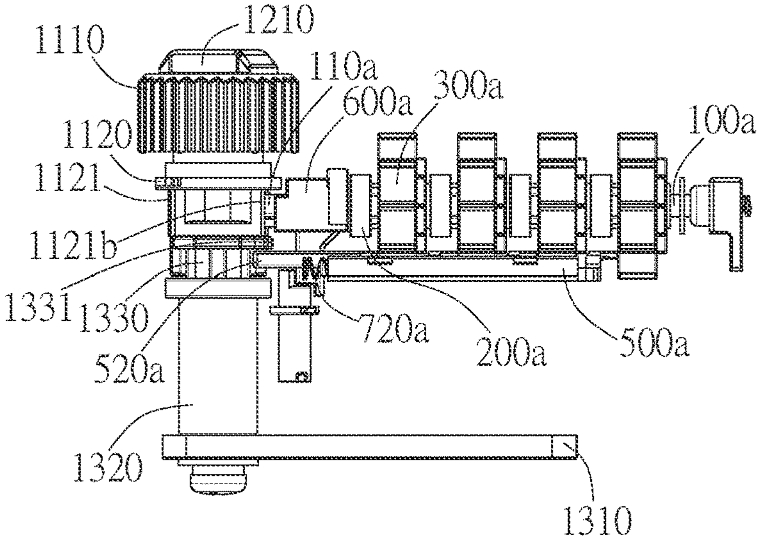
Figure 9C:
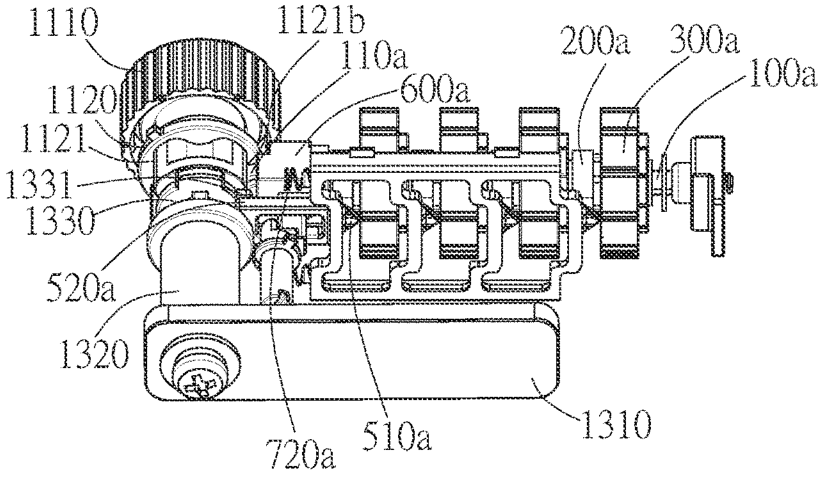

In an embodiment shown in FIG. 9A to FIG. 9C, if the code wheel 300*a* is located in the first unlocking position, the first unlocking component 100*a* may move in the first axial direction 901. Therefore, the end portion 110*a* does not restrict the rotation of the driving cylinder 1120. The user may rotate the baffle plate 1310 by rotating the first rotation member 1110, thereby making the baffle plate 1310 rotate to an unlocking position of the limiting member for unlocking.

On the other hand, if the code wheel 300*a* is not located in the second unlocking position, although the limiting member driving piece 1330 and the driving cylinder 1120 are fixed in an engaged manner, because the code wheel 300*a* is located in the first unlocking position, the driving cylinder 1120 may rotate. Therefore, the limiting member driving piece 1330 may also rotate, and may rotate the baffle plate 1310 by rotating the second rotation member 1210.

Figure 10A:
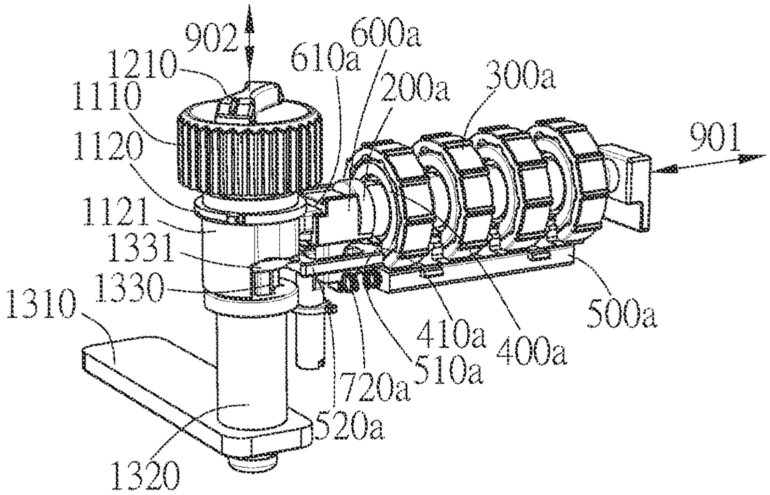
FIG. 10A to FIG. 10C are schematic diagrams of an embodiment of an engaging member being engaged with an engaging portion in the dual-code combination lock of the present utility model.
Figure 10B:
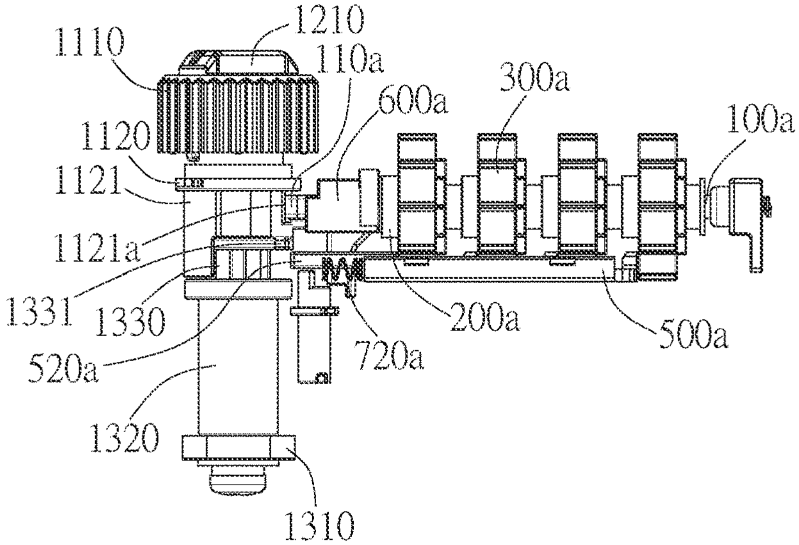
Figure 10C:
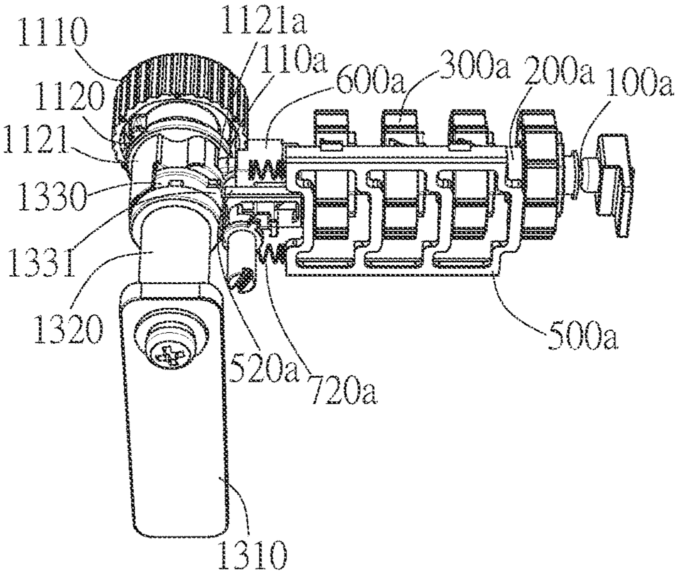

In an embodiment shown in FIG. 10A to FIG. 10C, the code wheel 300*a* is not located in the first unlocking position, the first unlocking component 100*a* cannot move in the first axial direction 901. Therefore, the end portion 110*a* is fixedly located in the first peripheral surface concave portion 1121*a*, to restrict the rotation of the driving cylinder 1120. On the other hand, in the embodiment shown in FIG. 10A, if the code wheel 300*a* is located in the second unlocking position, engaging portions 410*a* of all second code components 400*a* correspond to engaging members 510*a*. Therefore, the second unlocking component 500*a* moves in the first axial direction 901, to make the engaging members 510*a* engaged with the engaging portions 410*a*, i.e., the engaging members 510*a* are essentially close to the code wheels 300*a*. An elastic member 720*a* provides an elastic force in the first axial direction 901 to make the second unlocking component 500*a* away from the driving cylinder 1120. In this case, in the embodiment shown in FIG. 10B, the limiting end portion 520*a* of the second unlocking component 500*a* leaves between the limiting flange 1331 of the limiting member driving piece 1330 and the limiting member rotation shaft 1320.

Figure 11A:
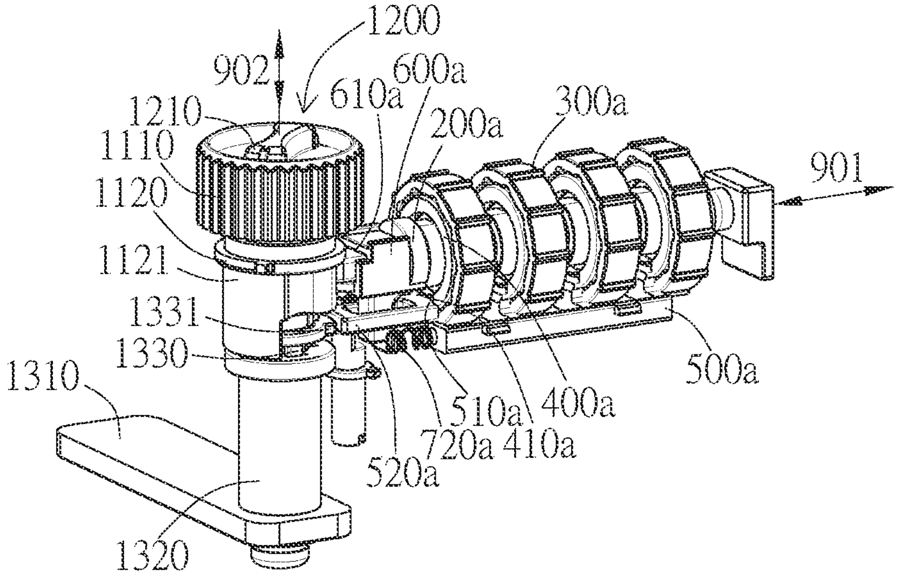
FIG. 11A to FIG. 11D are schematic diagrams of an embodiment of a second control member moving toward a limiting member rotation shaft to make a fixing portion separated from a fixing member in the dual-code combination lock of the present utility model.
Figure 11B:
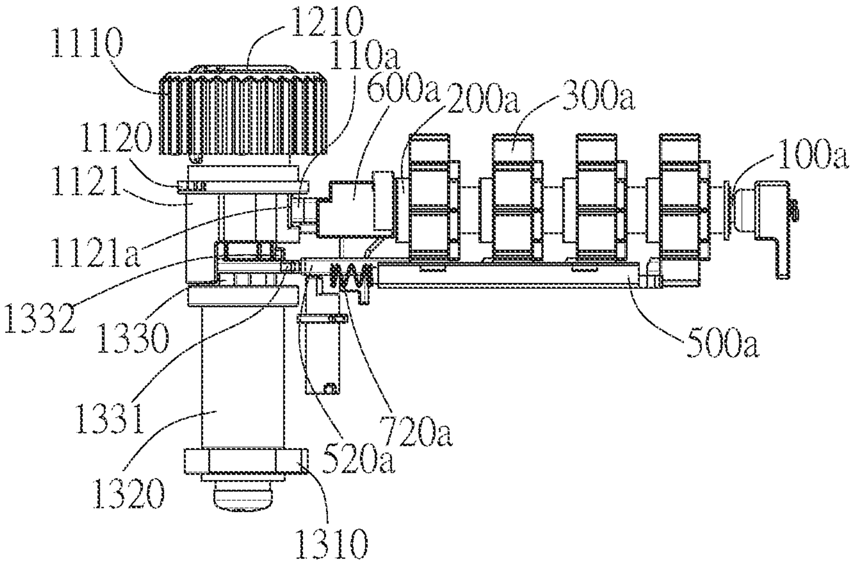
Figure 11C:
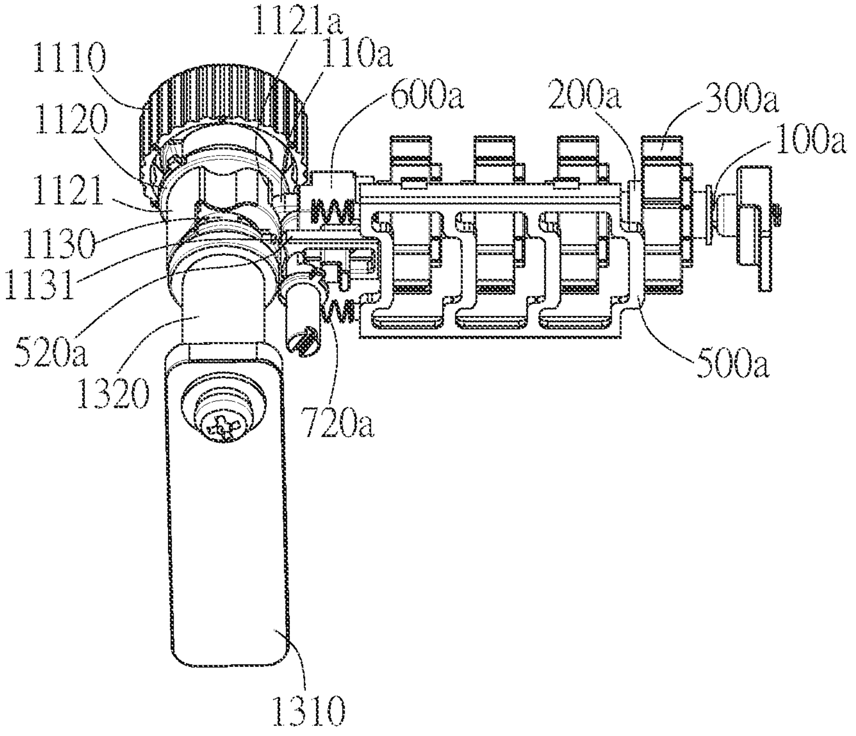
Figure 11D:
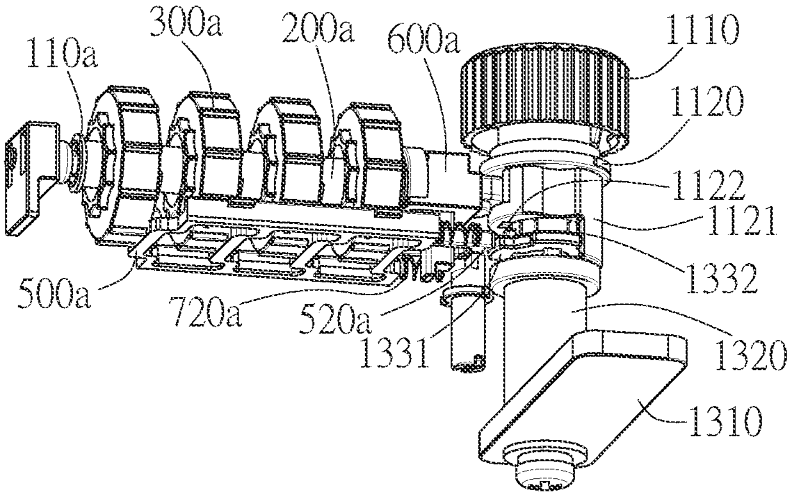
Figure 12A:
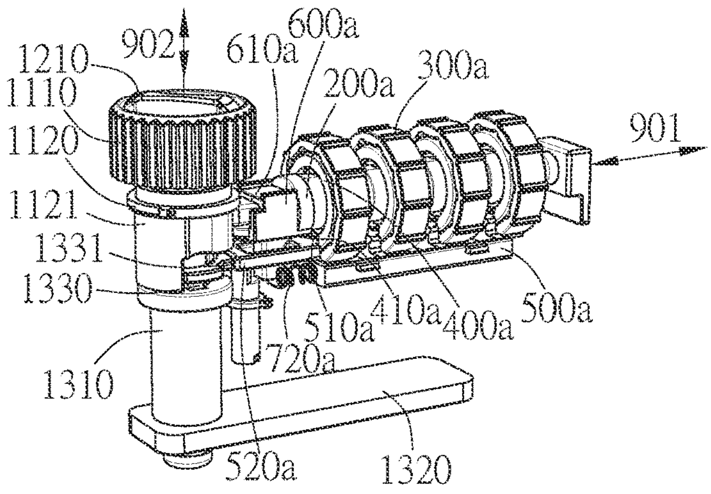
FIG. 12A to FIG. 12C are schematic diagrams of an embodiment of a second rotation member rotating a baffle plate to an unlocking position of a limiting member in the dual-code combination lock of the present utility model.
Figure 12B:
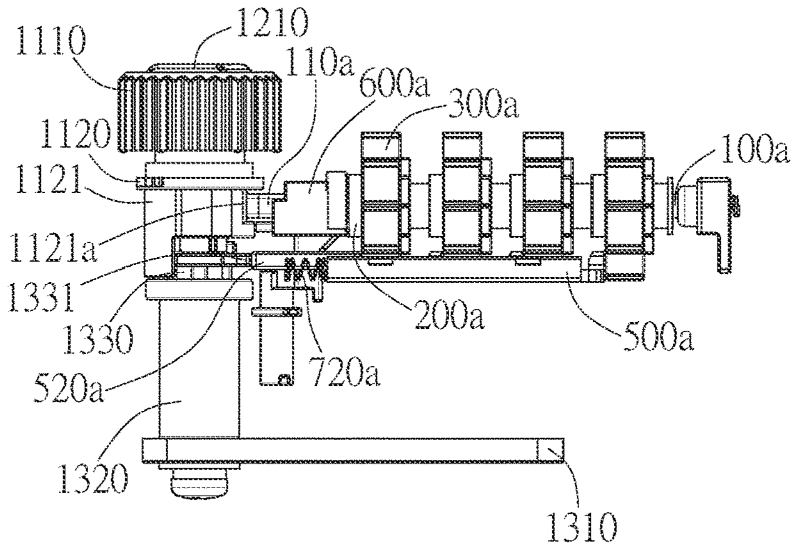
Figure 12C:
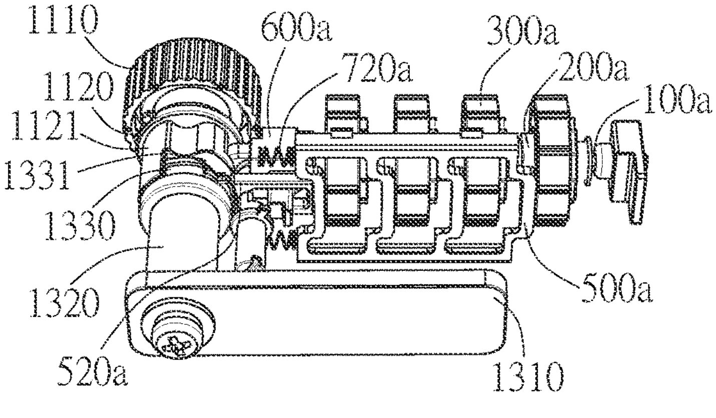

In an embodiment shown in FIG. 11A to FIG. 11D, when the limiting end portion 520*a* of the second unlocking component 500*a* leaves between the limiting flange 1331 of the limiting member driving piece 1330 and the limiting member rotation shaft 1320, the second control member 1200 may move toward the limiting member rotation shaft 1320 in a manner of pressing down, to make the fixing portion 1122 separated from the fixing member 1332 (referring to FIG. 11D). In other words, the limiting member driving piece 1330 may rotate independently relative to the driving cylinder 1120 in this case. Therefore, even if the code wheel 300*a* is not located in the first unlocking position to restrict the rotation of the driving cylinder 1120, the rotation of the limiting member driving piece 1330 cannot be restricted, and the limiting member driving piece 1330 may still be rotated by rotating the second rotation member 1210, thereby driving the limiting member rotation shaft 1320 to rotate the baffle plate 1310 from a locked position of the limiting member shown in FIG. 11A to FIG. 11D to an unlocking position of the limiting member shown in FIG. 12A to FIG. 12C.

Although the foregoing description and drawings have disclosed exemplary embodiments of the present utility model, it should be understood that various additions, many modifications, and substitutions may be made thereto without departing from the spirit and scope of the principles of the present utility model as defined by the appended claims. Those ordinarily skilled in the art of the present utility model will appreciate that the present utility model is applicable to modifications of many forms, structures, arrangements, proportions, materials, components, and components. Therefore, the embodiments disclosed herein should be considered as illustrative and not restrictive of the present utility model. The scope of the present utility model should be defined by the appended claims, and covers the legal equivalents thereof, but is not limited to the foregoing descriptions.

What is claimed is:

1. A dual-code lock core, comprising:

a first unlocking component;

a code wheel; and a second unlocking component, wherein when the code wheel rotates to a first unlocking position, the first unlocking component moves to unlock the dual-code lock core; and when the code wheel rotates to a second unlocking position, the second unlocking component moves to unlock the dual-code lock core;

wherein:

the first unlocking component extends in a first axial direction;

the code wheel is sleeved on the first unlocking component;

the second unlocking component is arranged at an outer side of the code wheel, and is provided with an engaging member toward the code wheel; and when the code wheel rotates to a position other than the first unlocking position, movement of the first unlocking component is restricted; and when the code wheel rotates to a position other than the second unlocking position, the engaging member is away from the code wheel;

wherein the dual-code lock core further comprises:

a first code component, sleeved on the first unlocking component, wherein the code wheel is sleeved outside the first code component; and a second code component, arranged in the code wheel in a manner of surrounding the first code component, wherein when the code wheel rotates to the second unlocking position, the second unlocking component is movable so as to be separated from or engaged with the second code component;

wherein:

the first code component is provided with a first code component outer edge convex piece;

the code wheel is provided with a first inner edge and a second inner edge;

the second code component is arranged in the second inner edge of the code wheel in the manner of surrounding the first code component, and is provided with an engaging portion; and when the code wheel is located in the first unlocking position, the first code component is movable in the first axial direction for making the first code component outer edge convex piece separated from or engaged with the first inner edge; and when the code wheel rotates to the second unlocking position, the second unlocking component is movable in the first axial direction for making the engaging member separated from or engaged with the engaging portion.

2. The dual-code lock core according to claim 1, wherein the first unlocking position and the second unlocking position are independently defined.

3. The dual-code lock core according to claim 1, wherein the second code component and the code wheel are integrally formed.

4. A dual-code combination lock, comprising:

a housing;

the dual-code lock core according to claim 1, arranged in the housing;

a limiting member, arranged at one side of the housing, and is rotatable relative to a second axial direction;

a first control member, connected to the limiting member, to control movement of the first unlocking component and rotation of the limiting member; and a second control member, connected to the limiting member, to control movement of the second unlocking component and the rotation of the limiting member.

5. The dual-code combination lock according to claim 4, wherein the limiting member comprises:

a baffle plate;

a limiting member rotation shaft, is rotatable relative to the second axial direction, and connected to one end of the baffle plate to drive the baffle plate to rotate relative to the second axial direction; and a limiting member driving piece, separately connected to the limiting member rotation shaft, the first control member, and the second control member, and rotating relative to the second axial direction and moving in the second axial direction.

6. The dual-code combination lock according to claim 5, wherein the first control member comprises:

a first rotation member which is rotatable relative to the second axial direction, and arranged at the other side of the housing relative to the limiting member; and a driving cylinder, rotating relative to the second axial direction, wherein two opposite ends of the driving cylinder are separately connected to the first rotation member and the limiting member driving piece, and the driving cylinder is provided with a peripheral surface separately abutting against an end portion of the first unlocking component and a first code component driving piece; and the second control member rotates relative to the second axial direction and moves in the second axial direction, is arranged at the other side of the housing relative to the limiting member, and is provided with a second rotation member and a second control member rotation shaft that are connected to each other, and the second control member rotation shaft penetrates the housing and the first rotation member and is connected to the limiting member driving piece.

7. The dual-code combination lock according to claim 6, wherein a fixing portion is provided on a bottom portion of the driving cylinder, a fixing member corresponding to the fixing portion is provided on a top portion of the limiting member driving piece, and the second control member moves toward the limiting member rotation shaft to make the fixing portion separated from the fixing member; and the second unlocking component comprises a limiting end portion, the limiting member driving piece comprises a limiting flange, and when the second unlocking component moves in the first axial direction to make an engaging member separated from an engaging portion, the limiting end portion is located between the limiting flange and the limiting member rotation shaft, to stop the second control member from moving toward the limiting member rotation shaft to make the fixing portion separated from the fixing member.

8. A dual-code combination lock, comprising:

a housing;

the dual-code lock core according to claim 4, arranged in the housing;

a limiting member, arranged at one side of the housing, and is rotatable relative to a second axial direction;

a first control member, connected to the limiting member, to control movement of the first unlocking component and rotation of the limiting member; and a second control member, connected to the limiting member, to control movement of the second unlocking component and the rotation of the limiting member.

9. A dual-code combination lock, comprising:

a housing;

the dual-code lock core according to claim 5, arranged in the housing;

a limiting member, arranged at one side of the housing, and is rotatable relative to a second axial direction;

a first control member, connected to the limiting member, to control movement of the first unlocking component and rotation of the limiting member; and a second control member, connected to the limiting member, to control movement of the second unlocking component and the rotation of the limiting member.

* * * * *